United States Patent [19]

Fukuyama et al.

[11] Patent Number: 4,918,423
[45] Date of Patent: Apr. 17, 1990

[54] TIRE INSPECTION DEVICE

[75] Inventors: Hiroshi Fukuyama, Tokyo; Makoto Morinaga, Chigasaki; Norio Goshima, Tokyo; Makoto Nakao, Tokyo; Kiyoshi Oono, Tokyo; Isao Watanabe, Tokyo, all of Japan

[73] Assignee: Bridgestone Corporation, Tokyo, Japan

[21] Appl. No.: 223,493

[22] Filed: Jul. 25, 1988

[30] Foreign Application Priority Data

Jul. 23, 1987 [JP] Japan ................................ 62-184542
Dec. 15, 1987 [JP] Japan ................................ 62-317165
Dec. 23, 1987 [JP] Japan ................................ 62-326415

[51] Int. Cl.⁴ .......................................... B60C 23/00
[52] U.S. Cl. .................................. 340/442; 340/445; 340/448; 116/34 R; 73/146.5; 73/146.8; 200/61.22
[58] Field of Search ................. 340/58, 539, 442, 445, 340/448; 116/34 R, 34 A, 34 B; 73/146.5, 146, 146.8; 200/61.22

[56] References Cited

U.S. PATENT DOCUMENTS

| 4,074,227 | 2/1978 | Kalmus | 340/58 |
| 4,308,520 | 12/1981 | Darlington | 340/539 |
| 4,704,901 | 11/1987 | Rocco et al. | 340/58 |

Primary Examiner—Donnie L. Crosland
Attorney, Agent, or Firm—Jordan & Hamburg

[57] ABSTRACT

A device for inspecting the pressure, temperature, etc. in a tire includes a pressure sensor attached to a valve mounted on the tire rim and having an output that varies depending upon the tire internal pressure, and a resonator including a resonant coil and capacitor which resonates in the presence of an external radiation electromagnetic wave. An oscillation coil of an oscillator which generates the external radiation electromagnetic wave projects from the main body of the inspection device. The main body encloses a signal processor which detects and processes any change in oscillation state which has taken place at the oscillator, as caused by the resonance state of the resonator, and a display to display the result of the signal processing by the signal processor.

6 Claims, 10 Drawing Sheets

TIRE INSPECTION DEVICE

BACKGROUND OF THE INVENTION

1. Field of the Invention

The present invention relates to a tire inspection device quite suitable for checking the tire internal pressure and detecting the temperature in the tire, the strain of the tire wheel and the like.

2. Description of the Prior Art

Conventional means for detecting, for example, tire internal pressure (air pressure), are devices including a detection device fitted on the tire side and having detectors which utilize electromagnetic induction, electromagnetic resonance etc. to detect the tire internal pressure even while the automobile is running. They are so-called the non-contact systems. Other devices are also known which transmit the tire internal pressure through a slip ring, ejection rod or the like. They are so-called contact systems. The tire internal pressure detectors of the non-contact systems are complicated, and so have high manufacturing costs. Further, wheels especially made for this system, the modification, etc. of automobiles are required as well. Furthermore, the maintenance of their reliability and environmental durability is difficult. And, what is more, a cost increase is required to solve these problems.

In addition, display-type tire internal pressure detectors have hitherto been developed as a low-cost means. However, when they break down, the tire internal pressure is released to the air due to their original construction. Defective operation is apt to occur under the low temperature during the winter season due to freezing. Therefore, they have problems in reliability and safety, so they have not yet attained a stage of the practical use.

Moreover, with respect to any known tire internal pressure detectors, tire valves are merely manufactured for the purpose of filling the tire with air and maintaining the airtightness, and do not have structure for serving the function of detecting the pressure and temperature in the tire.

As described above, various tire pressure internal detections have been developed. However, no contrivance has been made to the tire valves employed for them. Above all, no fully satisfactory tire pressure detectors have been developed yet to date.

BRIEF SUMMARY OF THE INVENTION

An object of the invention is to provide a tire inspection device quite suitable for the detection of the tire internal pressure and temperature in the tire, the strain of the wheel and the like.

In order to achieve the above-mentioned object, this invention consists basically of two units: one unit, which is fitted to the valve fixed to a tire fixing rim, is comprised of a sensor having an output that changes depending on the tire internal pressure and the temperature in the tire, etc.; and a resonance part containing a condenser and a resonance coil which resonates in response to external radiant electromagnetic waves. The other unit, which is a portable main body of tire inspection device, is comprised of an oscillator which generates the above-mentioned radiant electromagnetic waves; an oscillating coil projected from the said main body; a signal processing part which detects and processes the change of oscillating conditions produced in the said oscillator caused by resonance condition in the above-mentioned resonance part which changes according to the afore-mentioned tire internal pressure, temperature, etc.; and a display externally displaying the processed result.

In accordance with the invention, when the oscillating coil projecting from the portable main body of the inspection device is brought near the resonance part fitted to the valve fixed to the rim, the resonance condition changes as a function of the value detected by the sensor in the resonance part. Then, the change of the resonance condition is detected, and after signal processing, it is displayed in the display.

DESCRIPTION OF THE PREFFERRED EMBODIMENT

Figure 1:
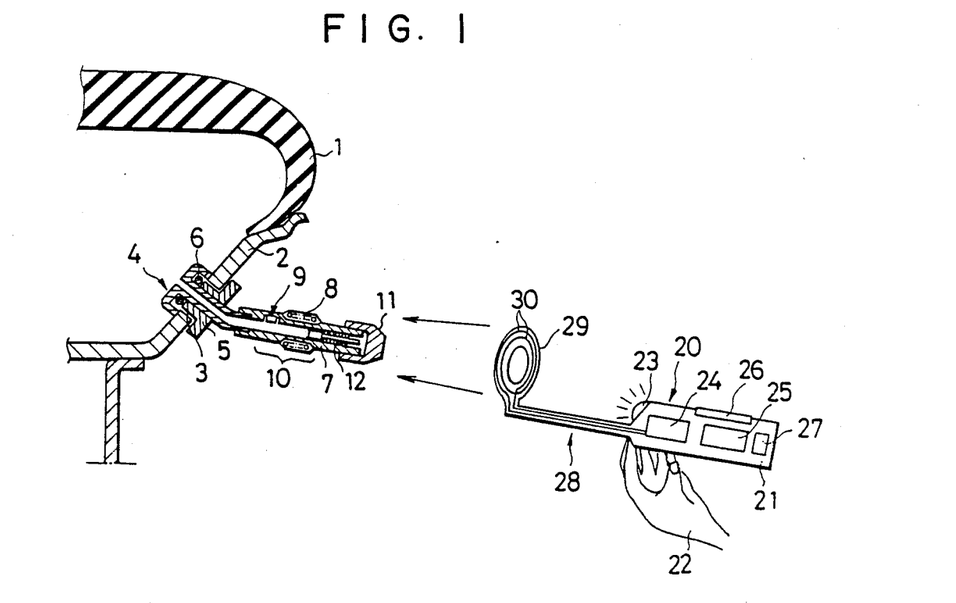
FIG. 1 is a schematic drawing of the overall tire inspection device of this invention.

The tire inspection device of this invention will now be explained on the basis of illustrated embodiments:

In FIG. 1, a tire 1 is mounted on a tire rim 2, and a hole 3 for fitting a valve 4 is made in a slant of the rim 2. In order to seal the gap, an O ring 6 is inserted inside the base end of the valve 4, the valve having a threaded cylindrical circumference so that the air does not leak from the above-mentioned hole 3. The outer end of the valve 4 receives a valve fixture 5 having internal threads. The fixture 5 is screwed on the valve so that the valve 4 is tightly fixed to the rim 2 to seal in the air. A slender cylinder 7 housing a resonance part is screwed on the outer end of the valve 4. A cap 11 is screwed to the end of the cylinder 7 to prevent the intrurusion of mud, etc.

The coil 8 is wound a suitable number of times around the middle part of the periphery of the cylinder 7, and a pressure sensor 9, which turns on and off depending on the tire pressure volume, is fitted onto the hollow of inner wall of the cylinder 7, and is located near the coil 8.

In addition, a rubber packing 12 acting as a valve for entry and escape of air is attached to the end of the cylinder 7.

The composition of a main body 20 of the tire inspection device of this invention will now be described:

As shown in FIG. 1, the main body 20 is a slender rectangular parallelepiped which can be held in one hand 22, and a light 23 is mounted on a slanted side of the front part so that one can for example, clearly see the valve 4 and the like even in the dark. A display 26 is provided on the main body 20 so that when the tire internal pressure has the proper value, a green lamp lights, and when it is less than the proper value, a red lamp lights in the said display.

Moreover, a detecting rod 28 projects from the front part of the main body 20. Fitted to the front end of the detecting rod 28 is a ring 29 with a round hole in the center. The ring 29 can be positioned around the outside of the resonance part 10. An oscillating coil 30 is provided in the ring 29, in the form of the widening of the above-mentioned hole, and is connected to an oscillator 24 housed in the main body 20. The oscillator 24 is connected to a signal processing part 25. Furthermore, a battery 27, which is the power source of the above-mentioned light 23, the oscillator 24, etc. are housed in a casing 21 of the main body 20.

Figure 2:
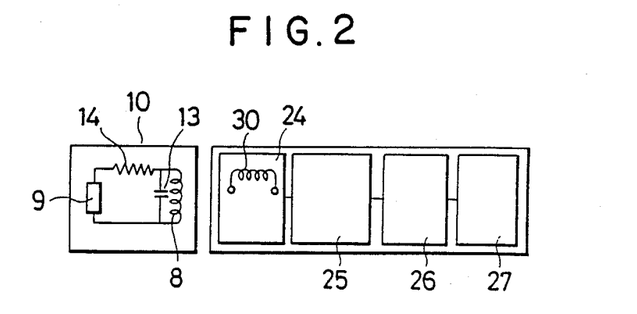
FIG. 2 is a block diagram showing the construction of the electric circuit of the device of this invention.

The block composition of the electric circuit of the tire inspection device of this invention will now be described with reference to FIG. 2:

A pressure sensor 9, a capacitor 13 and a coil 8 are connected in parallel in a resonance part 10 mounted on the tire. The pressure sensor 9 turns on and off, for example according to the volume of the tire pressure. In addition, a resistor 14 for adjusting the characteristic is connected between the pressure sensor 9 and the capacitor 13.

On the other hand, the main body 20 of the tire inspection device is comprised of such component parts as the oscillator 24 containing the oscillating coil 30 and a signal processing part 25 for detecting the output of the oscillator 24 and performing a comparison, etc.

In addition, the display 26 containing the green and red lamps lights up according to the output of the signal processing part 25 to display the inspection result to one who conducts the inspection.

The use the tire inspection device of this invention will now be described:

As shown in FIG. 1, the ring 29 of the main body 20 is first positioned around the outside of the resonance part 10, which is fitted to the rim 2 of the automobile (not illustrated), with the power source switch of the main body 20 turned on.

Thereupon, in case the tire internal pressure has, for example, the proper value, the pressure sensor 9 turns on, and the green lamp of the display 26 lights due to the function of electric circuit to be discussed below.

On the contrary, in case the tire pressure is lower than the proper value, the pressure sensor 9 turns off, and the red lamp of the display 26 lights, indicating the pressure is below the proper value.

Figure 3:
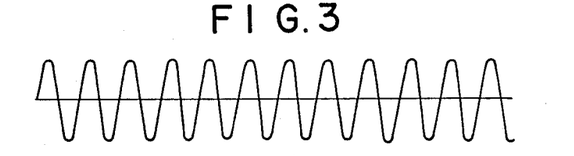
FIG. 3 to FIG. 5 are electrical performance views of the device of this invention.
Figure 4:
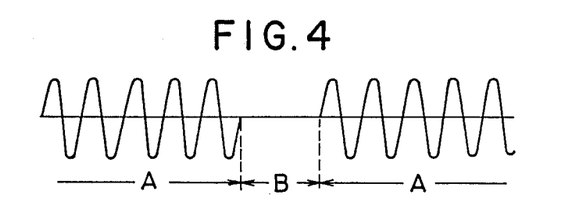

The performance of electric circuit of the tire inspection device of this invention will now be explained with FIG. 3 to FIG. 5:

FIG. 3 shows the wave form of the oscillating current indicating the oscillating condition of the oscillator 24, while FIG. 4 shows the condition wherein the oscillating current of the oscillator 24 changes when the coil is moved to the resonance part 10 mounted on the wheel. The wave forms shown at A in this figure indicate the condition wherein the resonance part 10 and the oscillator 24 part are separated from each other so that the latter is not affected by the resonance part 10. The wave form shown at B indicates that, when the resonance part 10 approaches the oscillating coil 30 of the oscillator 24, the electric current in the oscillator 24 becomes abnormal as the oscillating energy is absorbed in the resonance part 10, and, as a result, the amplitude of the oscillating current becomes almost zero.

Figure 5:
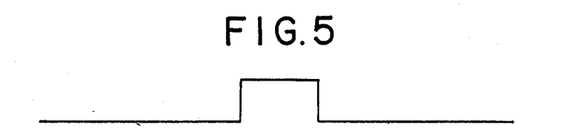

The signal processing part 25 detects and makes, as mentioned above, a comparison, etc. of the change in the output signal from the oscillator 24, and outputs an H level signal in proportion to the interval of width corresponding to B as shown in FIG. 4, and energizes the green lamp of the display 26 light in proportion to the interval of the H level shown in FIG. 5.

On the contrary, in case the tire pressure is lower than the proper value when the ring 29 of the main body 20 is moved to the vicinity of the resonance part 10, the pressure sensor 9 (see FIG. 2) remains in "off" condition, so the resonance part 10 does not form a closed loop. Accordingly, when the ring 29 of the main body 20 approaches the resonance part 10, the output of the oscillator 24 remains as shown in FIG. 3. Therefore, the H level signal as indicated in FIG. 5 does not occur. In such a case, the red lamp of the display 26 lights, and warning is given to show the user that the tire internal pressure is below the proper value.

As described above, an inspection device can be simply fabricated in accordance with the invention, and the inspection method becomes quite easy. In addition, the tire inspection device of this invention makes the re-modeling of automobiles, rims, etc. unnecessary since the oscillator, display, etc. are external devices. In addition, the resonance part is only fitted to the tire valve, so the aforesaid environmental conditions are not severe, and high reliability can be obtained.

Hitherto, the number of oscillators and displays (that is, the main body of the tire inspection device) has been required was the same as the number of tires of the automobiles, whereas the present invention requires the minimum necessary number of main bodies of the inspection devices regardless of the number of tires. Needless to say, truck, bus and taxicab companies, etc. are required to control the tire internal pressure of their motor vehicles. In such cases, even if they own a large number of motor vehicles, if they employ the inspection device of this invention, a very few main bodies of the devices will meet their requirement, and they can carry out the collective control system of the tire pressure, etc. at a low expense.

Although these companies are required to make some adjustment to maintain the accuracy of the displays of the main bodies of the devices, thanks to a small number of the main bodies, they can reduce the cost required for the adjustment.

In general, concerning the vehicles particularly driven on muddy roads, in cold districts, etc., the outsides of the valves are likely to become very dirty with mud, etc. or to be adhered to mud. Even in case mud and the like freezes to the outsides of the valves in the winter season, as long as the tire inspection device of this invention is utilized, the inspection can be conducted with ease, because the removal of the valves, etc. is not required.

When checking inner tires of dual wheels of large automobiles such as buses, the checking by the device of this invention can be easily done since the oscillating coil can be simply brought near the tips of the tire valves.

The pressure sensor in the examples of this invention indicates whether the tire pressure has the proper value or not, by on-off action of the switch. However, in other pressure sensors the resistance value changes analogously according to the tire pressure volume as in the case of, for example, the use of a variable resistor. In this case, the tire internal pressure may be indicated in detail in the display 26 of the said main body. For example, if a liquid crystal display means is used, the tire pressure condition can be seen more precisely.

The valve 4 of an optimum structure for measurement of the pressure and temperature in a tire will now be described with reference to FIG. 6 and subsequent Figures.

Figure 6:
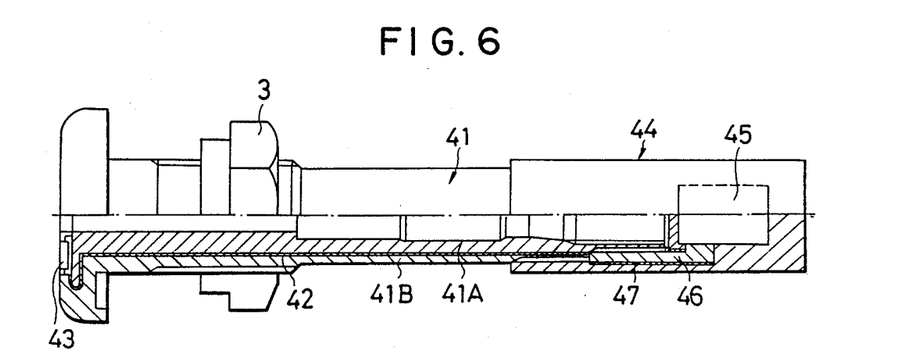
FIG. 6 is a cross-sectional view showing an example of the tire valve utilized for this invention.
Figure 7:
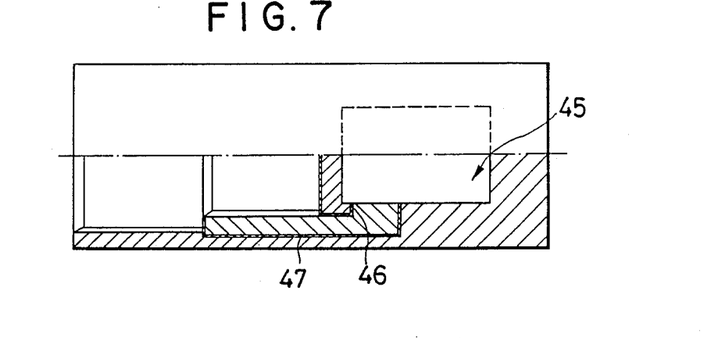
FIG. 7 is a cross-sectional view of the cap.
Figure 8:
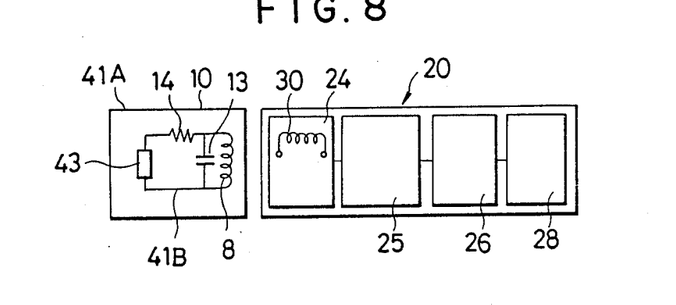
FIG. 8 is a block diagram of an example of the device using the tire valve shown in FIG. 6.
Figure 9:
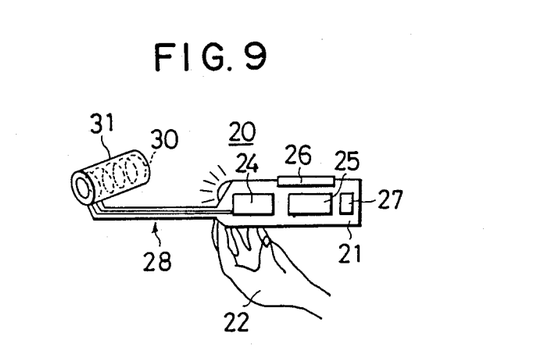
FIG. 9 is a perspective view of the main body of the device.

Referring now to FIG. 6, a valve stem 41 of the valve 4 made of a conductive material (usually brass) is comprised of a first conductive member 41A and a second conductive member 41B electrically isolated from one other by means of an insulative member 42 made of an insulator. A sensor 43, for example, a pressure sensor, is provided on the end of the valve stem 41. One side of the sensor is connected to the first conductive member 41A and the other side thereof is connected to the second conductive member 41B. In the embodiment shown in FIG. 6, the cap 44 of the valve stem 41 incorporates an electronic circuit 45 having a signal wire 46 connected to the first conductive member 41A and the other signal wire 47 connected to the second conductive member 41B. Thus, when the cap 44 is attached to the valve stem 41, a signal from the sensor 43 can be received by the electronic circuit 45 through the first and second conductive members 41A and 41B as lead wires and processed for the display. The details of the cap 44 incorporating this electronic circuit 45 are shown in FIG. 7. This cap 44 is also made of a conductive material. The base end of the first conductive member 41A insulated by the insulative member 42 is in contact with the signal wire 46 while the base end of the second conductive member 41B is in contact with the signal wire 47. If the tire inspection system is built using the tire valve 4 shown in FIGS. 6 and 7, it can be fabricated, for example, as shown in FIGS. 8 and 9. That is, the sensor 43 provided at the end of the valve stem 41 is connected to the electronic circuit 45 by means of the first and second conductive members 41A and 41B serving as lead wires, and the electronic circuit 45 is provided thereon with a capacitor 14 and coil 8, forming as a whole a resonator 10. The main body 20 of the inspection device comprises a cylinder 31, oscillating coil 30 provided in the cylinder 31, and an oscillator 24 to which the oscillating coil 30 is connected. The oscillator 24 is connected to a signal processor 25 which is in turn connected to a display 26. A lamp 23 and a battery 27 feeding the oscillator 24, etc. are housed in a casing 21. The lamp 23 is provided to illuminate the valve 4 in a dark place or at night for easy placement of the cylinder 31 around the valve 4. The display 26 lights blue when the detected tire internal pressure, etc. is appropriate, but it lights red if the detected value is inappropriate. In the embodiment shown in FIG. 9, the cylinder 31 is used in place of the ring 29 in FIG. 1. Of course, however, the ring 29 may be used.

Figure 10:
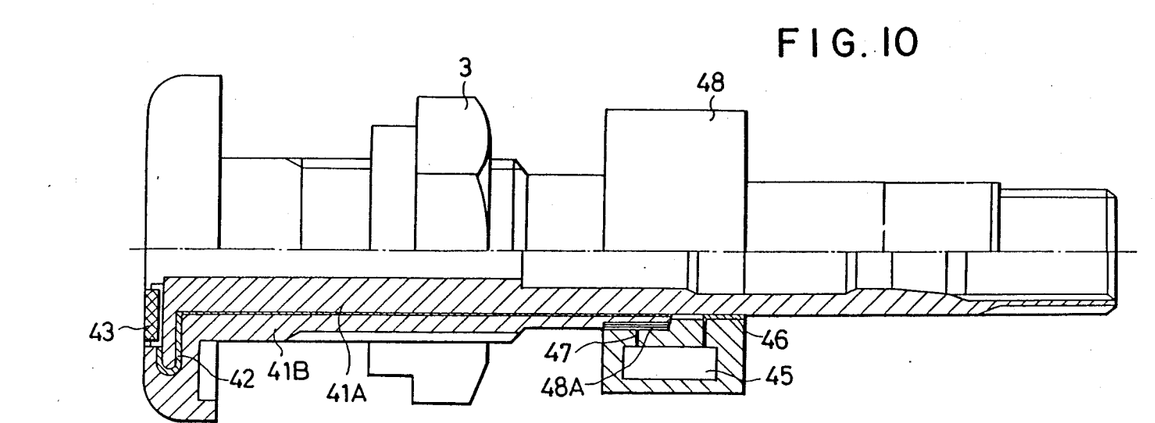
FIG. 10 is a cross-sectional view of another example of the tire valve utilized for this invention.

FIG. 10 shows an embodiment of the tire valve. In this embodiment, the electronic circuit 45 is not incorporated in the cap 44, but in a member (such as nut or the like) fixed to the valve stem 41. The reference numeral 48A indicates a thread.

Figure 11:
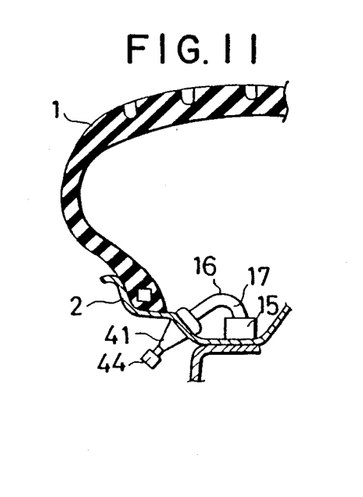
FIG. 11 is a partial sectional view of another tire valve.

FIG. 11 shows another embodiment of the tire valve in which a combination of the sensor 15 and electronic circuit 45 is installed inside the tire 1, namely, to the rim 2 of the wheel, and the signal wires 16 and 17 are connected to the first and second conductive materials 41A and 41B, respectively.

Figure 12:
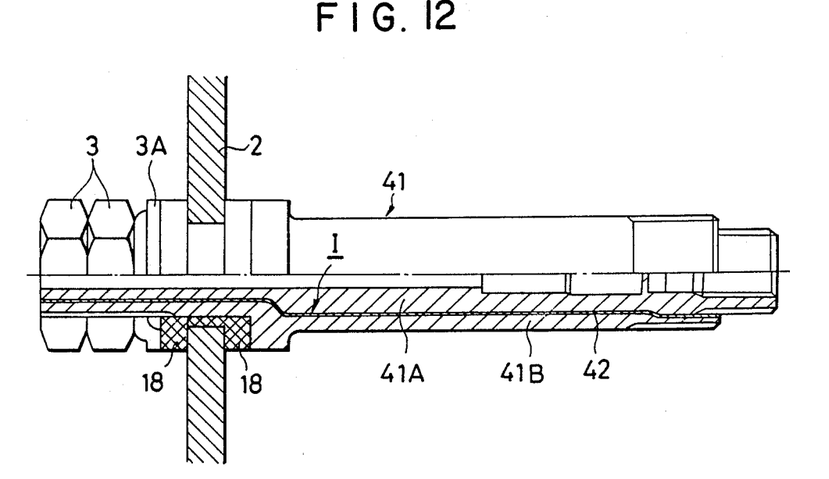
FIG. 12 to FIG. 20 are sectional views of tire valves showing examples having a variety of shapes, formed portions, etc. of the first and second electric conductors as well as the insulted parts.
Figure 13:
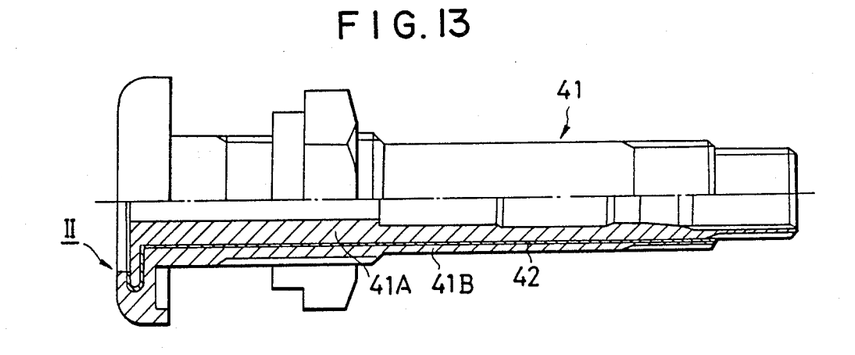
Figure 14:
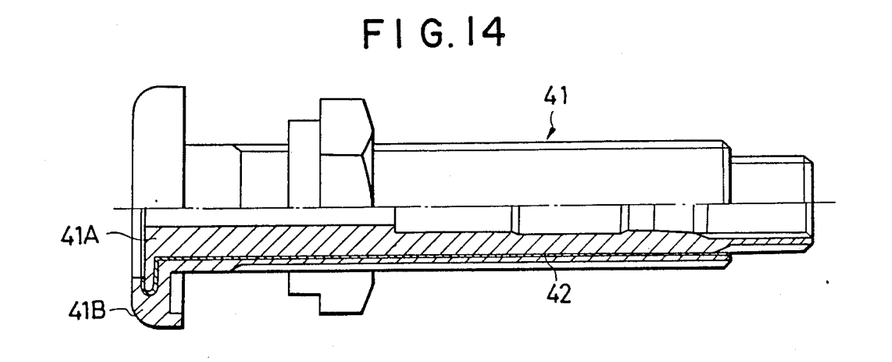
Figure 15:
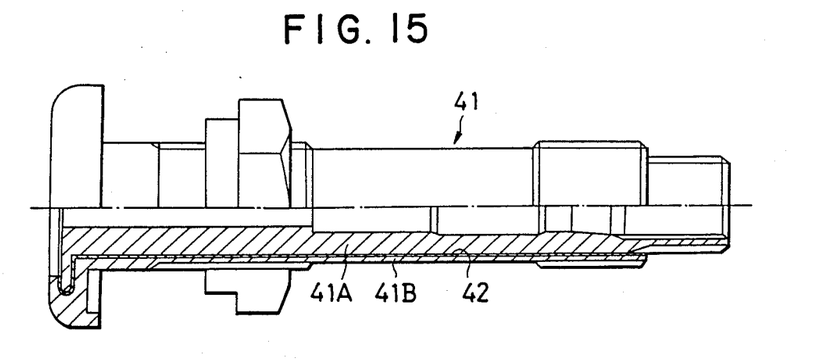
Figure 16:
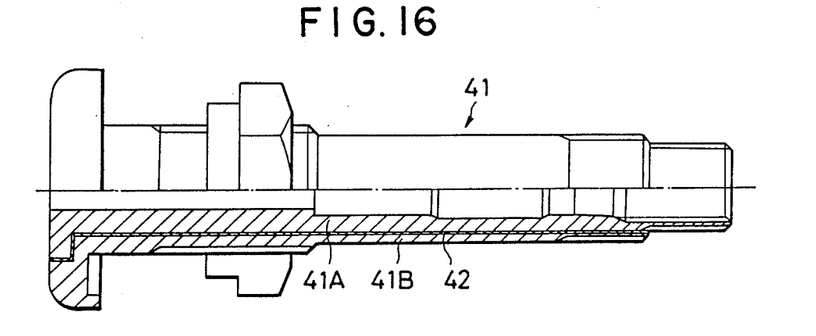
Figure 17:
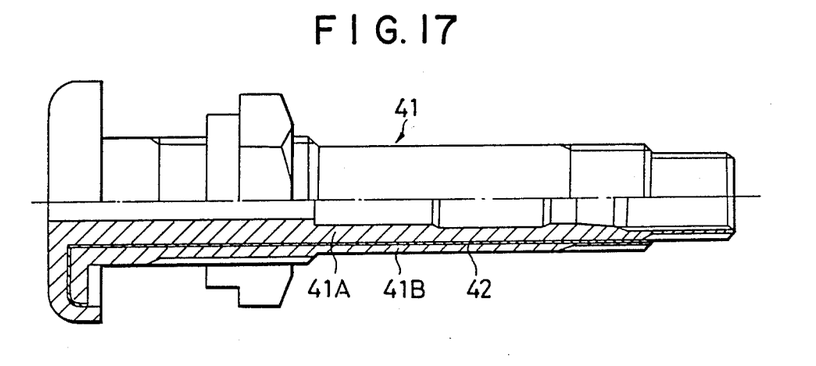
Figure 18:
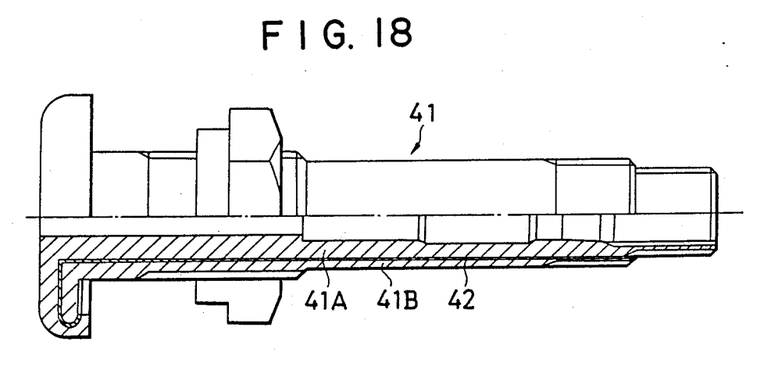
Figure 19:
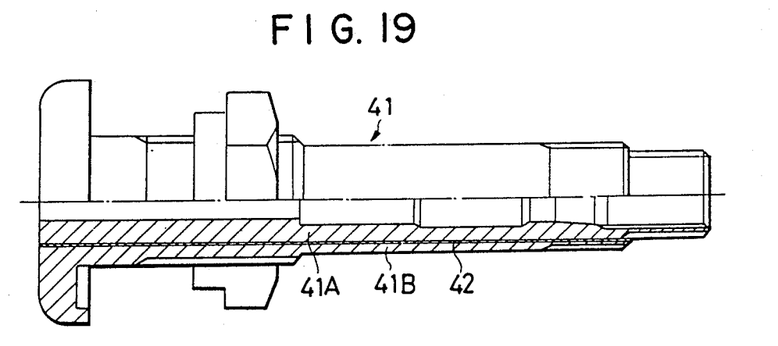

FIGS. 12 thru 20 show other embodiments of the tire valve having different locations for the insulative member 42. In FIG. 12, the insulative member 42 insulating the first and second conductive members 41A and 41B from each other is not straight in the axial direction but is so stepped at an intermediate point (indicated with I in Figure) that the first conductive member 41A is thinner at the free end side thereof (in the tire) than at the base side (at the cap side). Thus, when the first conductive member 41A is pressed from the base side thereof, it will not be separated from the second conductive member 41B. In FIG. 12, the reference numeral 3 indicates a valve fixing nut (fixing member), 3A a valve washer and 18 an insulative packing provided between the rim 2 and valve stem 41. In the embodiment shown in FIG. 13, the second conductive member 41B is fixed to the first conductive member 41A by calking the second conductive member 41B at the ends (indicated with II in FIG. 13) of these conductive members 41A and 41B, and an insulative member 42 is formed along the calked portion. Because of this calking, the first and second conductive members 41A and 41B are prevented from being displaced in the axial direction. FIGS. 14 thru 19 show further embodiments differing in the location of the insulative member 42 or in shape of the valve body 1 from one another.

Figure 20:
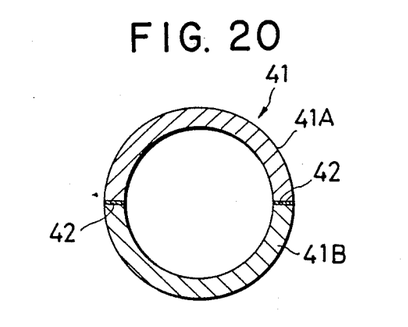

In all of the aforementioned embodiments, the first and second conductive members 41A and 41B have a cylindrical form, respectively. As shown in FIG. 20, however, the first and second conductive members 41A and 41B may be semicircle in sectional shape so that they form together a cylinder when attached to one another. The insulative member 42 may be sandwiched between these conductive members.

For leading out electric signals the pressure, temperature, etc. detected by the sensor 43 or the like from inside the tire wheel through the first and second conductive members 41A and 41B, either the contact or non-contact systems may be adopted.

As described above, the tire valve in the inspection device has a valve stem made of a conductor composed of at least two conductive members electrically isolated from each other by means of an insulative member made of an insulator for leading out electric signals relating to the pressure, temperature, etc. detected by the sensor or the like from inside the tire wheel through the two conductive members. Therefore, it it no longer necessary to specially work the wheel, and with either of the contact or non-contact systems, to lead out such electric signals. The tire internal pressure or the like can be easily detected and a variety of inspection devices can be made at low cost.

Figure 21:
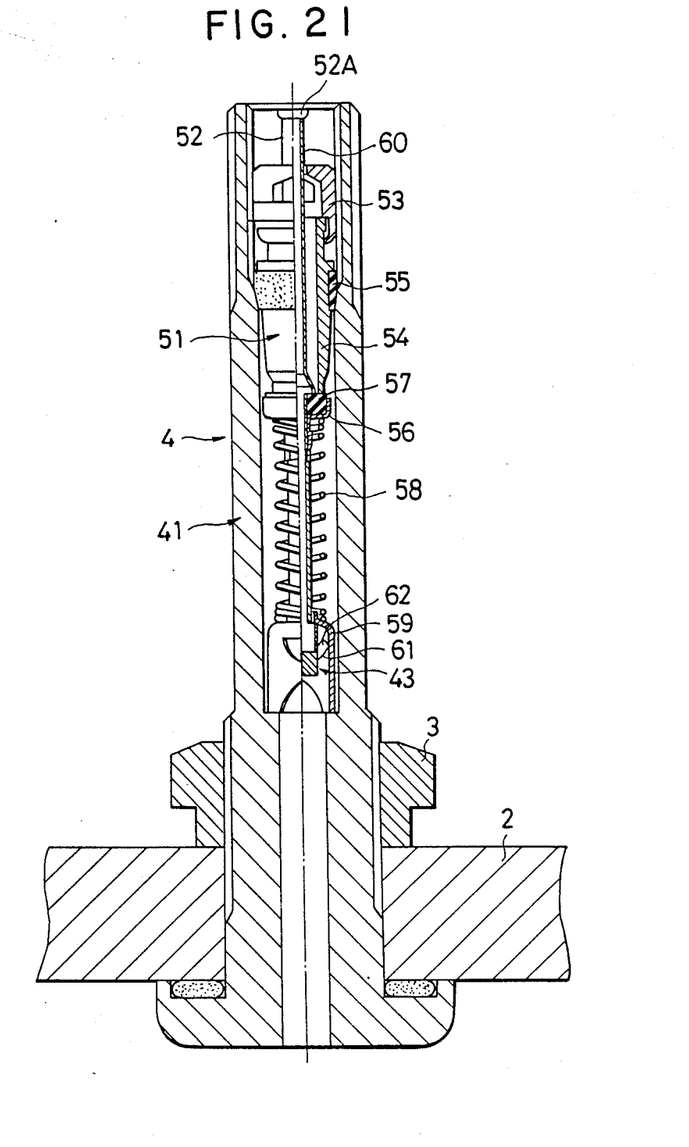
FIG. 21 is a sectional view of another example of the tire valve used for this invention.

Regarding the valve 24 shown in FIG. 21, the valve stem 41 has a valve core 51 and is so designed as to be fixed to the rim 2 with a nut 3 (fixing member). The valve core 51 has a shaft 52 and a head 53 in which the shaft 52 is inserted and which is screwed in the inner circumference of the valve stem 41. The valve core 51 has a head 53, and a body 54 is provided below the head 53. The box 54 has body packing 55 on its outer circumference to assure sealing between the body 54 and the inner circumference of the valve stem 41. The lower end of body 54 abuts a valve packing 57 provided around the shaft 52 and seated on a valve packing receiver 56. The head 53 is electrically connected to a spring holder 59 by means of the shaft 52 of the valve stem 41. Thus, the shaft 52 made of a conductor forms the first conductive member while the head 53 insulated from the first conductive member (shaft 52) by means of an insulative member 60, body 54, valve packing holder 56, spring 58, spring holder 59 and valve stem 41 form together the second conductive member. The end of the shaft 52 is provided with a sensor 43 having an electrode wire 61 held in contact with the inner surface of the spring holder 59 by means of a spring 62. The reason why the spring 62 is used to keep the electrode wire 61 in contact with the inner surface of the spring holder 59 is that, as the top 52A of the shaft 52 is pushed down, the electrode wire 61 also moves along the inner surface of the spring holder. The sensor 43 detects the internal pressure, temperature, etc. inside the tire and such pressure, temperature, etc. can be led out as electric signals through the first conductive member (shaft 52) and second conductive member (head 53, body 54, valve packing holder 56, spring 58 and spring holder 59). The valve core 51 blocks the air in the tire when it is in the position shown in FIG. 21, but when the top 52A of the shaft 52 is pushed down, the shaft 52 will push down the valve packing 57 and valve packing holder 56, whereby the sealing between the body 54 and valve packing 57 is released so that the air in the tire flows into the passage between the shaft 52 and body 54 and flows out through the clearance between the head 53 and shaft 52. Similarly, air can be injected into the tire.

Figure 22:
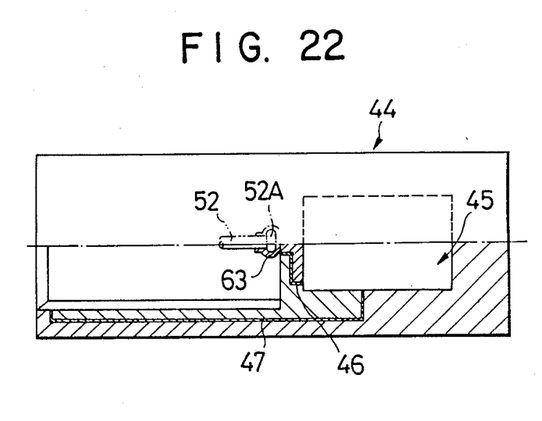
FIG. 22 is a sectional view of the cap.
Figure 23:
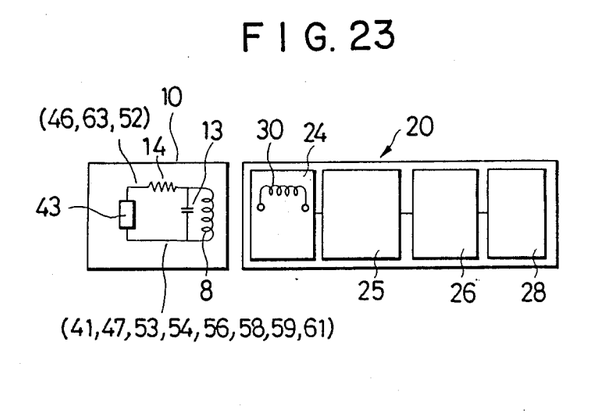
FIG. 23 is a block diagram of the device.

An example of the process after the information detected by such sensor 43 is led out as an electric signal through the first and second conductive members will now be described with reference to FIG. 22. The inspection of the tire internal pressure by the device according to the present invention will be explained under the assumption that the sensor 43 is a pressure sensor. The electronic circuit 45 is incorporated in the cap 44 screwed in the valve stem 41 and the signal wires 46 and 47 of the electronic circuit 45 are connected to the first and second conductive members, respectively. Thus, when the cap 44 is attached to the valve stem 41, a signal from the sensor 43 can be sent to the electronic circuit 45 through the first and second conductive members serving as lead wires, and the signal can be processed for display. The lead wire 46 is provided with a clip 63 made of a conductive material, which is in contact with the top 52A of the shaft 52, i.e., the first conductive member. Since the top 52A is not coated with any insulative material, the signal on the shaft 52, the first conductive member as lead wire from the sensor 43 can be sent to the electronic circuit 45 through the clip 63 and lead wire 46. The signal wire 47 permits the electronic circuit 45 to receive the signal sent from the sensor 43 through the valve stem 41. Therefore, in this embodiment, the valve stem 41 is also made of a conductive material to form a second conductive member. The electronic circuit 45 is provided in it with a capacitor 13 and coil 8 as in the embodiment shown in FIG. 8, and forms as a whole a resonator 10. The main body 20 of the inspection device is constructed as in FIG. 9. FIG. 23 is a block diagram of the inspection device, similar to that shown in FIG. 8.

It should be noted that the electronic circuit 45 may not always be incorporated in the cap 44 but it may be provided in a member installed in the valve stem 41. Also, note that the elements of the first conductive member and those of the second conductive member are not limited to those in the embodiments shown in the Figures. Appropriate parts can be selected with a consideration given to the electrical connection with the electronic circuit 45 and sensor 43. The first and second conductive members need only be electrically isolated from each other by means of an insulative member 60. Further, the present invention cannot only be applied to the straight valve having been illustrated and described in the foregoing but also to any curved or bent valve. Further, the conductive members are not limited only to the first and second ones but a third, fourth and further conductive members can be constructed.

Figure 24:
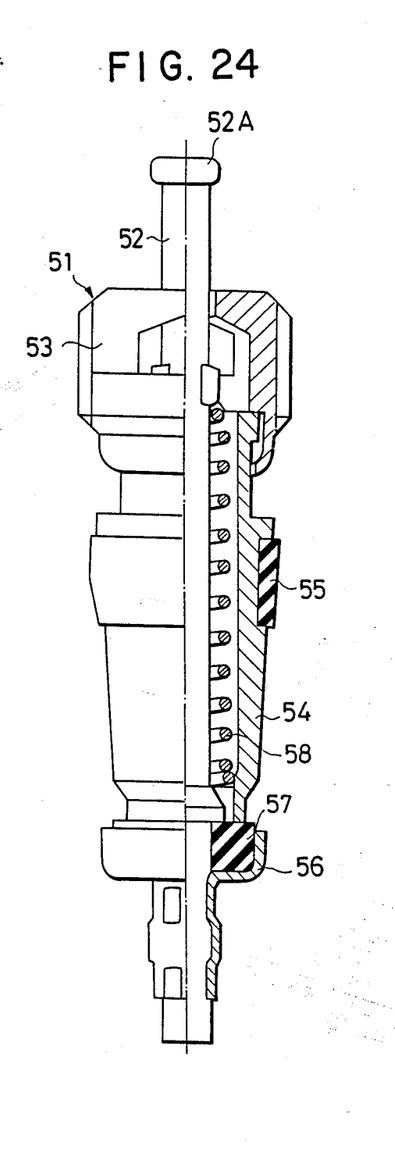
FIG. 24 is a sectional view of the valve core of the short type used for this invention.
Figure 25:
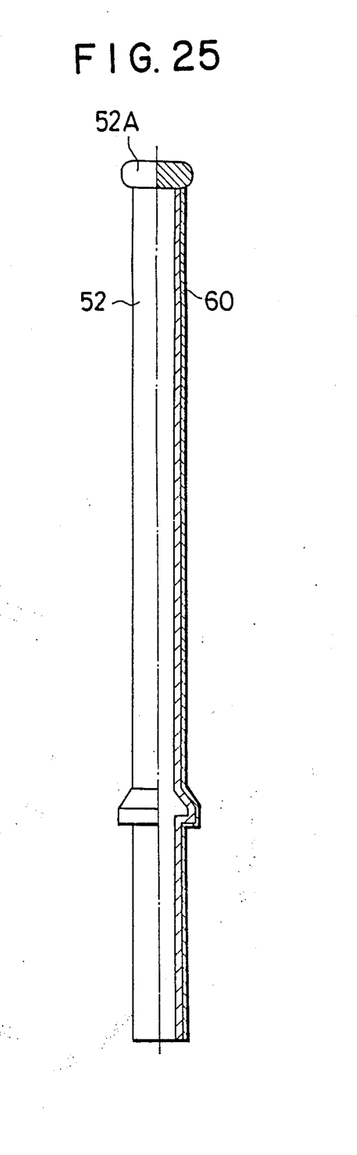
FIG. 25 is a sectional view of the axis utilized for the valve core shown in FIG. 24.

FIGS. 24 and 25 show a shorter valve core 51 and shaft 52. According to these embodiments, a spring 58 is incorporated in the body 54. Therefore, these embodiments need no spring holder 59. Also in these embodiments, the body 54 and valve packing holder 56 are not shown as connected but a projection or the like is provided which is in contact with either the body or valve packing holder. The body and valve packing holder are put into contact with each other by the projection to serve as lead wire through which electrical signal is sent.

For leading out as electric signal the pressure, temperature, etc. in the tire, detected by the sensor 43 or the like, from the inside the tire wheel through the first and second conductive members by using the sensor 43 or the like, either the contact or the non-contact system may be adopted.

The tire valve fabricated as described above is comprised of parts forming at least the first member and those forming the second conductive member, selected arbitrarily among the plural parts made of a conductor and forming the tire valve core and which are electrically isolated from one another by means of the insulative member made of an insulator to lead out as electric signals the sensor-detected pressure, temperature, etc. in the tire from the tire wheel inside through the first and second conductive members. Therefore, it is not necessary to specially work the wheel and it is easy to detect the pressure, etc. in the tire with either the contact or non-contact systems. Also a variety of inspection devices can be manufactured at low cost. The tire valve can be easily installed on either a tube tire and tubeless tire. Further, the tube valve can be manufactured without use of any high technology. That is, if the valve stem must be worked, a high technology is required since the durability of the valve stem must be maintained. However, since the first and second conductive members consisting of the parts of the valve core only need be electrically isolated from each other by means of an insulative member, the tire valve can be embodied at low cost. Also, the tire valve can be easily replaced similarly to the replacement of a conventional valve core.

What is claimed is:

1. In a tire inspection device for a tire adapted to be mounted on a rim of a wheel, the inspection device comprising a first element adapted to be mounted at least in part to a valve affixed to said rim, and a sensing device adapted to be moved into and away from a position adjacent said first element, the first element comprising a sensor for sensing a physical characteristic of said tire and/or said wheel, the improvement wherein:

said first element comprises a resonator, said resonator comprising a first coil and a capacitor coupled to said sensor, said first coil and capacitor comprising a resonant circuit that resonates in response to external electromagnetic radiation, whereby a resonance characteristic of said resonator varies as a function of a physical characteristic of said tire and/or wheel sensed by said sensor; and said sensing device comprises a main body including a signal processor, said processor having an oscillator with a second coil mounted externally of said main body, whereby oscillations of said oscillator produce an electromagnetic wave radiating from said second coil and said resonance characteristic of said resonator affects the state of oscillation of said oscilator when said second coil is positioned adjacent said first coil, said processor further comprising means for detecting changes in the state of oscillation state of said oscillator, and a display for indicating the occurrence of said changes of state of said oscillator.

2. The tire inspection device of claim 1 wherein said sensing device further comprises a light for enabling use of the device at locations of low light level.

3. The tire inspection device of claim 1 wherein said valve comprises a valve stem having first and second conductive members and an electrical insulator mounted to electrically insulate said first and second members from one another, said first and second conductive members connecting said sensor to said resonant circuit.

4. The tire inspection device of claim 1 wherein said valve comprises a valve core having a first part comprising a first conductive member and a second part comprising a second conductive member, and electrical insulating means mounted to electrically insulate said first and second parts from one another, said sensor being within said tire and being connected to said resonant circuit via said first and second conductive members.

5. The tire inspection device of claim 1 wherein said valve comprises a valve stem and a valve cap removably attached to said valve stem, said first coil and capacitor of said resonator being mounted in said valve cap.

6. The tire inspection device of claim 1 wherein said sensor is attached to said valve.

* * * * *